Dec. 13, 1949     H. M. REEVES     2,491,334
LEVEL POSITION INDICATOR FOR OIL STOVES
Filed Aug. 29, 1946
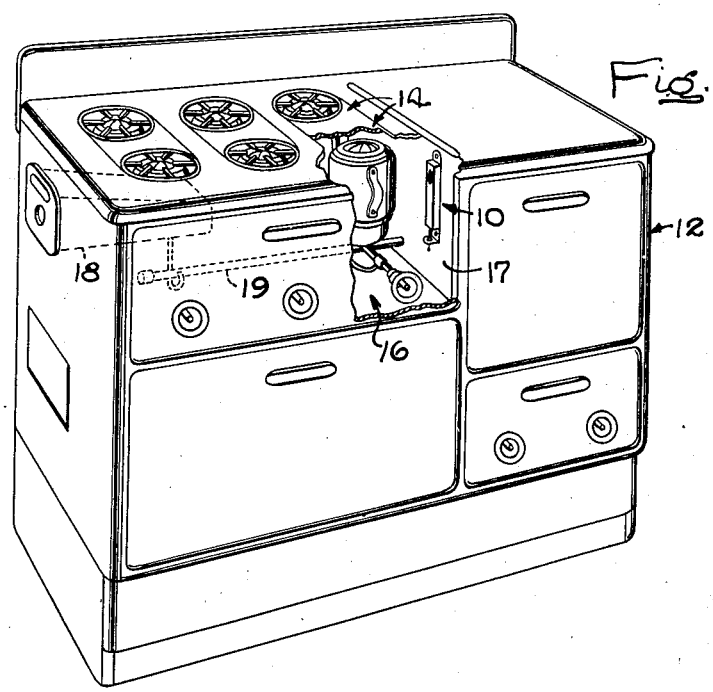
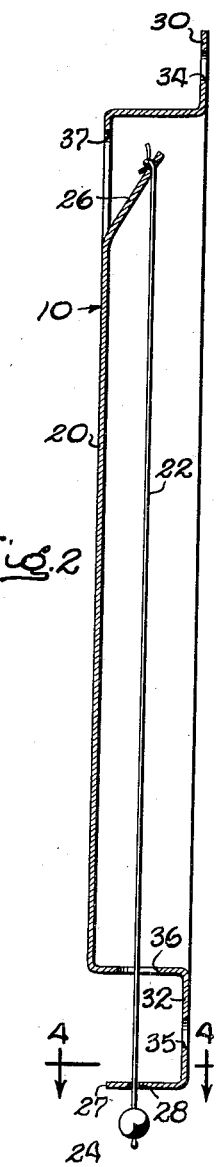
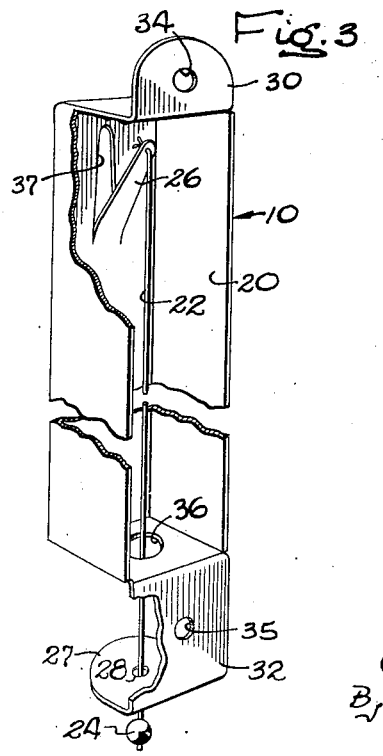
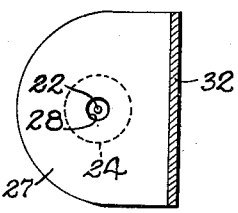
INVENTOR
Herbert M. Reeves
ATTORNEYS Patented Dec. 13, 1949

2,491,334

UNITED STATES PATENT OFFICE 2,491,334

LEVEL POSITION INDICATOR FOR OIL STOVES

Herbert M. Reeves, Kankakee, Ill., assignor to Florence Stove Company, Gardner, Mass., a corporation of Massachusetts Application August 29, 1946, Serial No. 693,692

1 Claim. (Cl. 33—216)

The present invention relates to level position indicating devices for oil stoves. Such stoves must necessarily be set level if proper and efficient operation is to obtain. Various methods for indicating a level position of stoves when they are installed for use have heretofore been utilized. One of these is the use of a spirit level as an indicator, the level being placed on or against some portion of the stove or its burners to show when a level condition is attained. This method is objectionable in that a level may not be readily available, and in any case it is difficult to locate positions at which the level can be accurately applied. Another method frequently resorted to is the comparison of the depths of the oil in the burner bowls either at different positions in a single bowl or in the bowls of several burners. The attendant disadvantage in so doing is the necessity of at least partial disassembly of the burners to gain access to the bowls.

Generally stated, it is an object of the invention to overcome the aforementioned disadvantages in the provision of a novel level position indicating device that is accurate yet simple and inexpensive to manufacture.

More particularly it is an object to provide an improved level position indicating means which is adapted to be permanently installed in an oil stove and which permits of initial setting for correct indication when the stove is assembled at the factory and thereafter requires no further adjustment or positioning when the stove is installed for use.

A more specific object is to provide a plumb bob assembly adapted for attachment to the stove body and in which the centering of the plumb line with respect to a gauge element is utilized to positively indicate a level position of the stove.

The objects of the invention thus generally set forth, together with other and ancillary advantages are attained by the construction and arrangement shown by way of illustration in the accompanying drawings, in which:

Figure 1 is a perspective view of an oil stove partially cut away to show a convenient installation location for the level position indicating device.

Fig. 2 is a sectional side elevation through the level position indicator.

Fig. 3 is a fragmentary rear perspective view of the device.

Fig. 4 is an enlarged sectional view of the indicator taken in a horizontal plane substantially along the line 4—4 of Fig. 2.

The present invention concerns a level position indicating device for attachment to an oil stove utilizing a level indicator and made adjustable so as to be capable of being set at the factory so as to facilitate placing the stove in a level position upon installation of the stove. In its preferred form the invention provides means of a simple and effectual nature, permitting of ready initial setting for accurate indication, thereafter requiring no further adjusting or positioning.

By way of illustration a level position indicating device 10 embodying the instant invention is shown in Figure 1 applied to a conventional wickless oil stove 12. As is customary the latter includes a plurality of top burner assemblies 14 disposed in a compartment 16. Fuel oil is furnished to these burner assemblies from a tank 18 by way of a supply pipe 19.

In the preferred embodiment of the invention as shown in the drawings, the level indicating device comprises, in general, a housing 20 that is adapted to be fixed to a stationary part of the stove body, and a level indicator in the form of a plumb line 22 and a plumb bob 24 suspended from a supporting element 26 and cooperating with a gauge element 27 to accurately indicate level position. For purposes of adjustment one of the elements 26, 27 is made movable. In the present instance, the supporting element 26 to which the line 22 is secured is in the form of an inwardly extending adjustable tongue, and the gauge element is in the form of a lug or tab 27 spaced from the tongue 26 and having a small hole 28 therein for the passage of the line 22.

The housing can be conveniently fashioned from a single piece of sheet material. It comprises a generally rectangular box-like structure having no rear wall. Extending upwardly at right angles from its top is a mounting tab 30. Projecting downwardly from the bottom of the housing is an extension 32. To secure the indicator to the stove, a hole 34 in the tab 30 and a hole 35 in the extension 32 are provided to accommodate attaching means such, for example, as self-tapping metal screws, rivets, or the like.

In order that the gauge element be exposed to view, the lower end of the extension 32 is bent to project horizontally outwardly to form the tab 27. The bottom wall of the housing has an opening 36 therein of sufficiently large dimensions to allow unobstructed passage of the line 22 therethrough.

It will be seen that by making the supporting element 26 in the form of a tongue struck out of the front wall of the housing 20 a slot 37 is left in the front wall which provides access to the tongue. The tongue can be readily bent by means of a suitable tool inserted through the slot 37 until the point of attachment of the line 22 is in exact vertical alignment with the aperture 28 in the extension 32. Since the tongue 26 projects inside the housing 20 to support the line 22, once its proper setting is fixed it is protected from accidental change of position by the housing 20.

The level position indicator is attached in any conveniently accessible location on the stove 12. Thus, it may be secured near the front of vertical wall 17 of the burner compartment 16. When the stove is initially assembled at the factory and the oil level is set during the testing procedure, a tool is inserted through the slot 37 and the setting of the tongue is adjusted so that the line 22 is centered in the aperture 28. Once a proper setting is determined, no further adjustment of the device is required. When the stove 12 is installed for use, it is leveled in the ordinary manner such, for example, as by the use of leveling screws that are usually provided in stoves of this type. An accurate indication of the reaching of level condition is denoted when the line 22 centers in the aperture 28. The aperture 28 is of only slightly larger diameter than that of the line 22, thus permitting of easy and accurate centering of the line in the aperture.

I claim as my invention:

A level position indicator for an oil stove comprising, in combination, a plumb bob, a plumb line, a sheet metal housing adapted to be permanently secured to a stationary portion of said stove, a gauge element including a forwardly extending tab mounted on and spaced below said housing and having a hole therein for the reception of said plumb line, a tongue struck inwardly from said housing leaving an aperture therein, said tongue affording support for said plumb line and being accessible through said aperture for adjustment of its position to permit centering of said line in said hole to indicate level position, and said housing affording protection for said tongue to prevent accidental dislocation thereof whereby the position to which the tongue is adjusted upon initial assembly of the stove is maintained to permit setting of the stove in level position upon its installation.

HERBERT M. REEVES.

REFERENCES CITED

The following references are of record in the file of this patent:

UNITED STATES PATENTS

| Number | Name | Date |
|---|---|---|
| 615,781 | Balser | Dec. 13, 1898 |
| 1,328,370 | Dutton | Jan. 20, 1920 |
| 2,288,706 | Herr | July 7, 1942 |

FOREIGN PATENTS

| Number | Country | Date |
|---|---|---|
| 539,564 | Great Britain | 1941 |